(12) United States Patent
Yamamoto et al.

(10) Patent No.: US 8,482,899 B2
(45) Date of Patent: Jul. 9, 2013

(54) ELECTRONIC COMPONENT INCLUDING PROTRUDING MOUNTING SURFACE REGIONS AND METHOD FOR MANUFACTURING THE SAME

(75) Inventors: Yoji Yamamoto, Nagaokakyo (JP);
Shunsuke Takeuchi, Nagaokakyo (JP);
Akihiro Motoki, Nagaokakyo (JP);
Makoto Ogawa, Nagaokakyo (JP);
Masahito Saruban, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 119 days.

(21) Appl. No.: 13/072,932

(22) Filed: Mar. 28, 2011

(65) Prior Publication Data

US 2011/0235234 A1  Sep. 29, 2011

(30) Foreign Application Priority Data

Mar. 29, 2010 (JP) .................................. 2010-075396
Feb. 24, 2011 (JP) .................................. 2011-037953

(51) Int. Cl.
*H01G 4/06* (2006.01)
*H01G 4/228* (2006.01)

(52) U.S. Cl.
USPC ..................................... 361/321.2; 361/306.3

(58) Field of Classification Search
USPC ............................................. 361/306.3, 321.2
See application file for complete search history.

(56) References Cited

U.S. PATENT DOCUMENTS

| 3,444,436 | A | * | 5/1969 | Coda | 361/306.3 |
| 4,419,714 | A | * | 12/1983 | Locke | 29/25.42 |
| 4,661,884 | A | * | 4/1987 | Seaman | 361/306.2 |
| 4,733,327 | A | * | 3/1988 | Behn et al. | 361/301.4 |
| 4,852,227 | A | * | 8/1989 | Burks | 29/25.42 |
| 5,621,619 | A | * | 4/1997 | Seffernick et al. | 361/773 |
| 6,960,366 | B2 | | 11/2005 | Ritter et al. | |
| 6,972,942 | B2 | | 12/2005 | Ritter et al. | |
| 6,982,863 | B2 | | 1/2006 | Galvagni et al. | |
| 7,067,172 | B2 | | 6/2006 | Ritter et al. | |
| 7,075,775 | B2 | * | 7/2006 | Yamazaki | 361/306.3 |
| 7,152,291 | B2 | | 12/2006 | Ritter et al. | |

(Continued)

FOREIGN PATENT DOCUMENTS

EP   1 890 304 A1   2/2008
JP   09-260206 A   10/1997

(Continued)

OTHER PUBLICATIONS

Machine translation of Japanese patent JP2001-093770A which was published on Apr. 6, 2001.*

(Continued)

*Primary Examiner* — David M Sinclair
(74) *Attorney, Agent, or Firm* — Keating & Bennett, LLP

(57) ABSTRACT

A laminate includes ceramic layers laminated to each other. Internal conductors are embedded in the laminate and include exposed portions that are exposed between the ceramic layers at a lower surface and an upper surface of the laminate. External electrodes are directly plated on the lower surface and the upper surface so as to cover the respective exposed portions. Regions of the lower surface at which the exposed portions are provided are arranged to protrude from the other regions of the lower surface, and regions of the upper surface at which the exposed portions are provided are arranged to protrude from the other regions of the upper surface.

5 Claims, 7 Drawing Sheets

U.S. PATENT DOCUMENTS

| | | |
|---|---|---|
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,295,421 B2 * | 11/2007 | Mihara et al. .............. 361/308.1 |
| 7,344,981 B2 | 3/2008 | Ritter et al. |
| 7,345,868 B2 | 3/2008 | Trinh |
| 7,463,474 B2 | 12/2008 | Ritter et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

FOREIGN PATENT DOCUMENTS

| | | | |
|---|---|---|---|
| JP | 2001093770 A | * | 4/2001 |
| JP | 2008-047907 A | | 2/2008 |
| WO | 20071049456 A1 | | 5/2007 |
| WO | 20071097180 A1 | | 8/2007 |

OTHER PUBLICATIONS

Matsumoto et al.; "Electronic Component and Producing Method Thereof"; U.S. Appl. No. 12/632,823, filed Dec. 8, 2009.

* cited by examiner

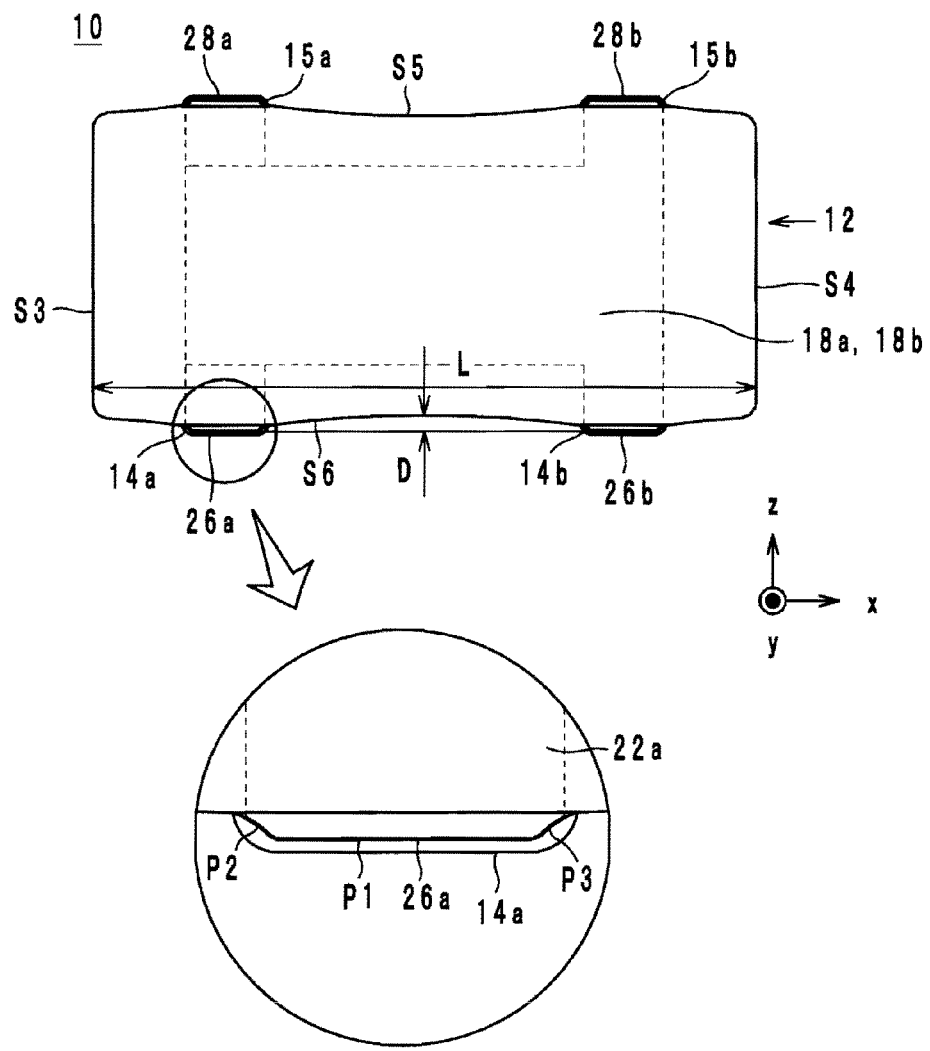

ELECTRONIC COMPONENT INCLUDING PROTRUDING MOUNTING SURFACE REGIONS AND METHOD FOR MANUFACTURING THE SAME

BACKGROUND OF THE INVENTION

1. Field of the Invention

The present invention relates to an electronic component and a method for manufacturing the same, and more particularly relates to an electronic component including a laminate in which ceramic layers are laminated to each other and a method for manufacturing the same.

2. Description of the Related Art

As a related electronic component, for example, a multilayer electronic component disclosed in Japanese Unexamined Patent Application Publication No. 2008-47907 is known. The multilayer electronic component described above includes a plurality of dielectric layers, a plurality of internal electrodes, and terminals. The dielectric layers and the internal electrodes are alternately laminated to each other. The terminals are external electrodes provided on side surfaces of a laminate including the dielectric layers. In the multilayer electronic component described above, the internal electrodes are exposed at the side surfaces of the laminate, and the terminals are formed by plating regions at which the internal electrodes are exposed.

In an electronic component including external electrodes which are formed by plating, such as the multilayer electronic component described above, it is desirable to form the external electrodes in a short time.

SUMMARY OF THE INVENTION

Accordingly, preferred embodiments of the present invention provide an electronic component including external electrodes which can be formed in a short time and a method for manufacturing the same.

An electronic component according to a preferred embodiment of the present invention includes a laminate including ceramic layers laminated to each other; a first internal conductor and a second internal conductor which are embedded in the laminate and include a first exposed portion and a second exposed portion, respectively, exposed between the ceramic layers at a mounting surface of the laminate; and a first external electrode and a second external electrode disposed on the mounting surface by plating so as to directly cover the first exposed portion and the second exposed portion, respectively, wherein regions of the mounting surface at which the first exposed portion and the second exposed portion are provided protrude from the other regions of the mounting surface.

According to preferred embodiments of the present invention, the external electrodes can be formed in a short time.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a perspective view of the electronic component when viewed from above in a lamination direction according to a preferred embodiment of the present invention.

DETAILED DESCRIPTION OF THE PREFERRED EMBODIMENTS

Hereinafter, an electronic component according to preferred embodiments of the present invention and a method for manufacturing the same will be described with reference to the drawings.

Figure 1:
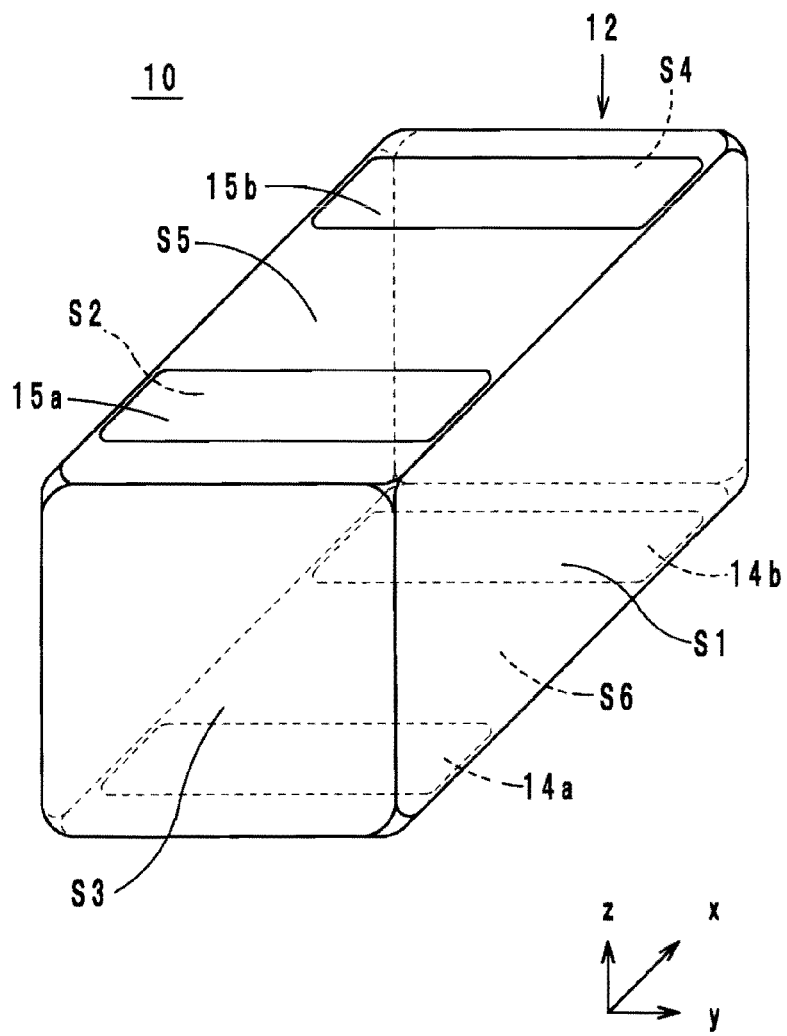
FIG. 1 is an appearance perspective view of an electronic component according to a preferred embodiment of the present invention.
Figure 2:
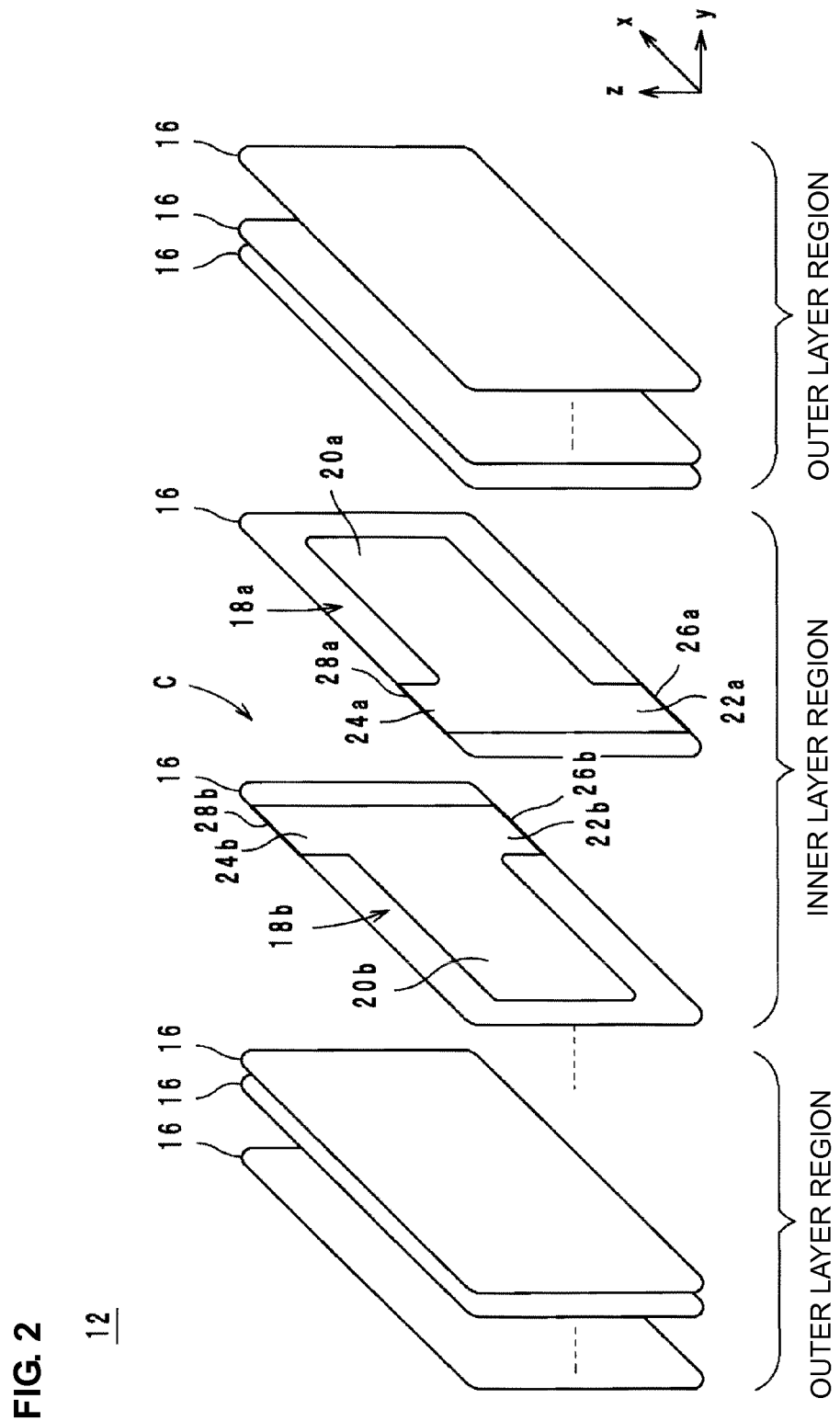
FIG. 2 is an exploded perspective view of a laminate of the electronic component according to a preferred embodiment of the present invention.

First, the structure of an electronic component will be described with reference to the drawings. FIG. 1 is an appearance perspective view of an electronic component 10. FIG. 2 is an exploded perspective view of a laminate 12 of the electronic component 10. FIG. 3 is a perspective view of the electronic component 10 when viewed from above in a lamination direction. In this preferred embodiment, a lamination direction of the laminate 12 is defined as a y axis direction. When the laminate 12 is plan viewed in the y axis direction, a longer side direction of the laminate 12 is defined as an x axis direction. When the laminate 12 is plan viewed in the y axis direction, a shorter side direction of the laminate 12 is defined as a z axis direction.

As shown in FIGS. 1 and 2, the electronic component 10 is a chip capacitor which includes the laminate 12, external electrodes 14 (14a and 14b) and 15 (15a and 15b), and a capacitor C (not shown in FIG. 1). The laminate 12 preferably has a substantially rectangular parallelepiped shape. However, since chamfering is performed, the laminate 12 preferably includes substantially round-shaped corners and ridge lines. Hereinafter, in the laminate 12, a surface at a positive direction side in the y axis direction is called a side surface S1, and a surface at a negative direction side in the y axis direction is called a side surface S2. In addition, a surface at a negative direction side in the x axis direction is called an end surface S3, and a surface at a positive direction side in the x axis direction is called an end surface S4. Furthermore, a surface at a positive direction side in the z axis direction is called an upper surface S5, and a surface at a negative direction side in the z axis direction is called a lower surface S6.

As shown in FIG. 2, the laminate 12 is preferably formed by laminating a plurality of ceramic layers 16. The ceramic layers 16 preferably each have a substantially rectangular shape and are each formed from a dielectric ceramic. As an example of the dielectric ceramic, for example, $BaTiO_3$, $CaTiO_3$, $SrTiO_3$, or $CaZrO_3$ may be used. In addition, at least one of the above materials may be used as a primary component, and at least one of a Mn compound, a Fe compound, a Cr compound, a Co compound, and a Ni compound may be used as an accessory component. The thickness of the ceramic layer 16 is preferably set in a range of about 0.5 μm to about 10 μm, for example. Hereinafter, a primary surface of the ceramic layer 16 at the positive direction side in the y axis direction is called a front surface, and a primary surface of the ceramic layer 16 at the negative direction side in the y axis direction is called a rear surface.

As described above, the side surface S1 of the laminate 12 is defined by the front surface of a ceramic layer 16 provided at the most positive direction side in the y axis direction.

The side surface S2 of the laminate 12 is defined by the rear surface of a ceramic layer 16 provided at the most negative direction side in the y axis direction. In addition, the end surface S3 is defined by the shorter sides of the ceramic layers 16 at the negative direction side in the x axis direction. The end surface S4 is defined by the shorter sides of the ceramic layers 16 at the positive direction side in the x axis direction. The upper surface S5 is defined by the longer sides of the ceramic layers 16 at the positive direction side in the z axis direction. The lower surface S6 is defined by the longer sides of the ceramic layers 16 at the negative direction side in the z axis direction.

As shown in FIG. 2, the capacitor C is preferably defined by capacitor conductors (internal conductors) 18 (18a and 18b) embedded in the laminate 12. It is preferable that the capacitor conductors 18 be formed, for example, of a conductive material, such as Ni, Cu, Ag, Pd, a Ag—Pd alloy, or Au, and have a thickness in a range of about 0.3 μm to about 2.0 μm, for example.

The capacitor conductor 18a is provided on the surface of one ceramic layer 16 and has a capacity portion 20a and lead portions 22a and 24a. The capacity portion 20a has a substantially rectangular shape and is not in contact with an outer edge of the ceramic layer 16. The lead portion 22a protrudes toward the negative direction side in the z axis direction from the vicinity of an end portion at the negative direction side in the x axis direction of a longer side at the negative direction side in the z axis direction of the capacity portion 20a. Accordingly, the lead portion 22a is extended to the longer side of the ceramic layer 16 at the negative direction side in the z axis direction. At a front end portion at the negative direction side in the z direction, the lead portion 22a has an exposed portion 26a that is exposed between adjacent two ceramic layers 16 at the lower surface S6 of the laminate 12. The lead portion 24a protrudes toward the positive direction side in the z axis direction from the vicinity of an end portion at the negative direction side in the x axis direction of a longer side at the positive direction side in the z axis direction of the capacity portion 20a. Accordingly, the lead portion 24a is extended to the longer side of the ceramic layer 16 at the positive direction side in the z axis direction. At a front end portion at the positive direction side in the z direction, the lead portion 24a includes an exposed portion 28a exposed between the adjacent two ceramic layers 16 at the upper surface S5 of the laminate 12.

The capacitor conductor 18b is provided on the surface of one ceramic layer 16 and includes a capacity portion 20b and lead portions 22b and 24b. The capacity portion 20b has a substantially rectangular shape and is not in contact with an outer edge of the ceramic layer 16. In addition, the capacity portion 20b faces the capacity portion 20a with the ceramic layer interposed therebetween. Accordingly, the capacity is generated between the capacity portions 20a and 20b. The lead portion 22b protrudes toward the negative direction side in the z axis direction from the vicinity of an end portion at the positive direction side in the x axis direction of a longer side at the negative direction side in the z axis direction of the capacity portion 20b. Accordingly, the lead portion 22b is extended to the longer side of the ceramic layer 16 at the negative direction side in the z axis direction. The lead portion 22b is located at the positive direction side in the x axis direction than the lead portion 22a. At a front end portion at the negative direction side in the z direction, the lead portion 22b includes an exposed portion 26b exposed between adjacent two ceramic layers 16 at the lower surface S6 of the laminate 12. The lead portion 24b protrudes toward the positive direction side in the z axis direction from the vicinity of an end portion at the positive direction side in the x axis direction of a longer side at the positive direction side in the z axis direction of the capacity portion 20b. Accordingly, the lead portion 24b is extended to the longer side of the ceramic layer 16 at the positive direction side in the z axis direction. The lead portion 24b is located at the positive direction side in the x axis direction than the lead portion 24a. At a front end portion at the positive direction side in the z axis direction, the lead portion 24b has an exposed portion 28b exposed between the adjacent two ceramic layers 16 at the upper surface S5 of the laminate 12.

The capacitor conductors 18a and 18b are preferably arranged on a plurality of the ceramic layers 16 so as to be alternately disposed in the y axis direction. Accordingly, the capacitor C is located at a region at which the capacitor conductor 18a faces the capacitor conductor 18b with the ceramic layer 16 interposed therebetween. In addition, a region in which the ceramic layers 16 provided with the capacitor conductors 18 are laminated is called an inner layer region. In addition, at a positive direction side of the inner layer region in the y axis direction, ceramic layers 16 each provided with no capacitor conductor 18 are laminated. As in the case described above, at a negative direction side of the inner layer region in the y axis direction, ceramic layers 16 each provided with no capacitor conductor 18 are laminated. Hereinafter, the two regions in which the ceramic layers 16 each provided with no capacitor conductors 18 are laminated are each called an outer layer region.

The external electrodes 14a and 14b preferably are disposed on the lower surface S6 of the laminate 12 by plating so as to directly cover the exposed portions 26a and 26b, respectively. The external electrode 14a is located at the negative direction side in the x axis direction than the external electrode 14b. The external electrodes 15a and 15b are disposed directly on the upper surface S5 of the laminate 12 so as to cover the exposed portions 28a and 28b, respectively. The external electrode 15a is located at the negative direction side in the x axis direction than the external electrode 15b. Since the external electrodes 14 and 15 are provided as described above, the capacitor C is connected between the external electrodes 14a and 15a and the external electrodes 14b and 15b. As a material for the external electrodes 14 and 15, for example, Cu may preferably be used.

The electronic component 10 has a unique structure which enables the external electrodes 14 and 15 to be formed in a short time. Hereinafter, this structure will be described in detail.

In the electronic component 10, as shown in FIG. 3, regions of the lower surface S6 at which the exposed portions 26a and 26b are provided protrude toward the negative direction side in the z axis direction from the other regions of the lower surface S6. An area including the exposed portions 26a and 26b is an area including the exposed portions 26a and 26b and portions of ceramic layers 16 provided therebetween. In other words, the lower surface S6 is concavely curved toward the positive direction side in the z axis direction between the region at which the exposed portion 26a is provided and the region at which the exposed portion 26b is provided. Furthermore, in this preferred embodiment, the lower surface S6 has a continuous curved surface between the region at which the exposed portion 26a is provided and the region at which the exposed portion 26b is provided. As described above, since the regions of the lower surface S6 at which the exposed portions 26a and 26b are provided protrude and the other regions of the lower surface S6 sink, as shown by an enlarged view of FIG. 3, the exposed portions 26a and 26b each have, besides a portion P1 parallel to the x-axis, portions P2 and P3 inclined to the x axis.

In addition, as shown in FIG. 3, the regions of the upper surface S5 at which the exposed portions 28a and 28b are provided protrude toward the positive direction side in the z axis direction from the other regions of the upper surface S5. However, since the structures of the exposed portions 28a and 28b and the upper surface S5 are the same as those of the exposed portions 26a and 26b and the lower surface S6, a further description will be omitted.

Figure 4A:
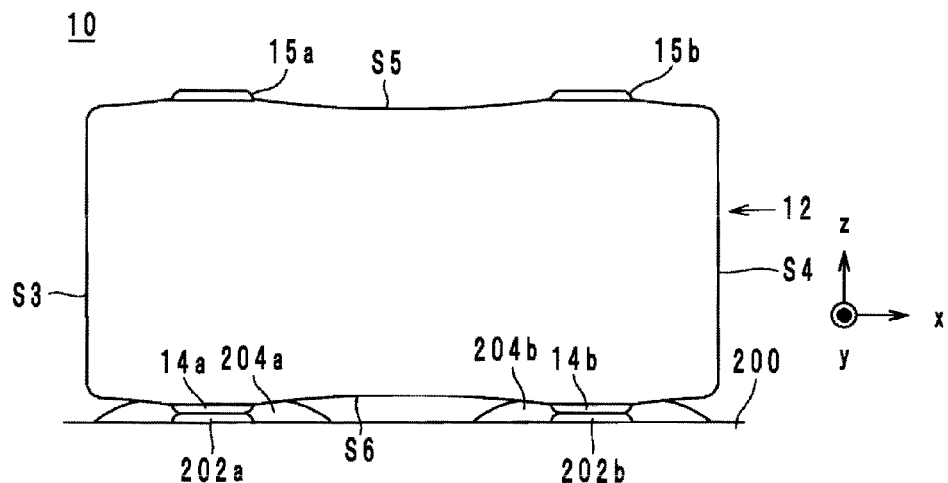
FIG. 4A is a view of an electronic component according to a preferred embodiment of the present invention mounted on a circuit board.

The electronic component 10 thus formed is mounted on a circuit board for use. Hereinafter, mounting of the electronic component 10 will be described with reference to the drawings. FIG. 4A is a view of the electronic component 10 according to this preferred embodiment mounted on a circuit board 200.

The circuit board 200 preferably is a printed-circuit board or the like and includes, as shown in FIG. 4A, lands 202 (202a and 202b) to mount the electronic component 10. When the electronic component 10 is mounted on the circuit board 200, the lower surface S6 is used as a mounting surface and is arranged to face a primary surface of the circuit board 200. In addition, the external electrodes 14a and 14b are arranged to face the lands 202a and 202b, respectively, and are then fixed thereon by solder. Accordingly, the electronic component 10 is mounted on the circuit board 200. In addition, in the electronic component 10, the upper surface S5 may be used as the mounting surface instead.

Next, a method for manufacturing the electronic component 10 according to a preferred embodiment of the present invention will be described. The method will be described with reference to FIGS. 1 to 3.

After $BaTiO_3$, $CaTiO_3$, $SrTiO_3$ or $CaZrO_3$ used as a primary component and a Mn compound, a Fe compound, a Cr compound, a Co compound, or a Ni compound used as an accessory component are weighed at a predetermined ratio and are then charged in a ball mill, wet mixing is performed. An obtained mixture is dried and is then pulverized, and an obtained powder is then calcined. After a calcined powder thus obtained is wet-pulverized, drying and pulverizing are sequentially performed, so that a dielectric ceramic powder is obtained.

To this dielectric ceramic powder, an organic binder and an organic solvent are added, and mixing is then performed using a ball mill. After an obtained ceramic slurry is formed into sheets on a carrier sheet by a doctor blade method, drying is performed so as to form ceramic green sheets which are to be formed into the ceramic layers 16. The thickness of each ceramic green sheet which is to be formed into the ceramic layer 16 is preferably in a range of about 0.5 μm to about 10 μm, for example.

Next, the capacitor conductors 18a and 18b are formed on the ceramic green sheets which are to be formed into the ceramic layers 16 by applying a paste containing a conductive material using a method, such as a screen printing or a photolithographic method. As the paste containing a conductive material, for example, a paste formed by adding an organic binder and an organic solvent to a metal powder may be used.

Next, the ceramic green sheets which are to be formed into the ceramic layers 16 are laminated, so that a green mother laminate is obtained. Subsequently, pressure bonding is performed on the green mother laminate by a hydrostatic pressure press.

Next, the green mother laminate is cut into a plurality of green laminates 12 each having a predetermined size. Next, the green laminate 12 is fired. As a firing temperature, for example, a temperature in a range of approximately 900° C. to 1,300° C. is preferable. By the steps described above, a fired laminate 12 in which the capacitor conductors 18 are embedded is prepared.

Next, a polishing process, such as a barrel polishing process, is performed on the surface of the laminate 12. More particularly, a barrel polishing process is performed so that the lower surface S6 is concavely curved between the region at which the exposed portion 26a is provided and the region at which the exposed portion 26b is provided and so that the upper surface S5 is concavely curved between the region at which the exposed portion 28a is provided and the region at which the exposed portion 28b is provided. In order to process the upper surface S5 and the lower surface S6 as described above, for example, a barrel polishing process may be performed for a relatively long time. The laminate 12 has a high brittleness as compared to that of the capacitor conductor 18. Hence, a region of the lower surface S6 between the region at which the exposed portion 26a is provided and the region at which the exposed portion 26b is provided and a region of the upper surface S5 between the portion at which the exposed portion 28a is provided and the region at which the exposed portion 28b is provided are more polished as compared to the regions of the upper surface S5 and the lower surface S6 at which the exposed portions 26a, 26b, 28a, and 28b are provided. As a result, the regions of the upper surface S5 and the lower surface S6 at which the exposed portions 26a, 26b, 28a, and 28b are provided protrude from the other regions, a continuous curved surface is provided between the region at which the exposed portion 26a is provided and the region at which the exposed portion 26b is provided, and in a manner similar to that described above, a continuous curved surface is formed between the region at which the exposed portion 28a is provided and the region at which the exposed portion 28b is provided.

By the barrel polishing process as described above, the exposed portions 26a, 26b, 28a, and 28b are more widely exposed from the upper surface S5 and the lower surface S6 as compared to those before the barrel polishing process is performed.

Next, the external electrodes 14 and 15 are formed from Cu by a plating method. In particular, the laminate 12 is charged in a barrel containing conductive media. Subsequently, the barrel is immersed in a plating solution and is rotated for a predetermined time. Accordingly, the conductive media come into contact with the exposed portions 26a, 26b, 28a, and 28b, so that an electrical power is supplied. As a result, Cu is deposited on the exposed portions 26a, 26b, 28a, and 28b, so that the external electrodes 14 and 15 are formed. By the steps described above, the electronic component 10 is formed.

According to the electronic component 10 and the method for manufacturing the same, the external electrodes 14 and 15 can be formed in a short time. In more particular, in a common electronic component, the side surface of a laminate thereof is flat. Hence, only the portion P1 parallel to the x axis of FIG. 3 is exposed from the side surface of the laminate, and the portions P2 and P3 inclined to the x axis are not exposed from the side surface of the laminate.

On the other hand, in the electronic component 10, as shown in FIG. 3, the portion P1 parallel to the x axis and the portions P2 and P3 inclined thereto are exposed from each of the upper surface S5 and the lower surface S6 of the laminate 12. Therefore, in the electronic component 10, the area of the capacitor conductor 18 exposed from the laminate 12 is larger than that of a common electronic component by the area of the portions P2 and P3 inclined to the x axis. Accordingly, the conductive media can easily come into contact with the capacitor conductor 18 as compared to the case of a common electronic component. As a result, according to the electronic component 10 and the method for manufacturing the same, the formation of the external electrodes 14 and 15 is promoted and can be performed in a short time.

In this preferred embodiment, in the electronic component 10, the exposed portions 26a and 26b and the exposed portions 28a and 28b preferably are exposed only from the lower surface S6 and the upper surface S5, respectively, and preferably are not exposed from the other surfaces. Hence, the probability of the conductive media to come into contact with the exposed portions 26a, 26b, 28a, and 28b of the electronic component 10 is relatively low. Accordingly, when the regions of the upper surface S5 and the lower surface S6 at which the exposed portions 26a, 26b, 28a, and 28b are provided are allowed to protrude from the other regions of the surfaces S5 and S6 so as to increase the probability of the conductive media to come into contact with the exposed portions 26a, 26b, 28a, and 28b, in the electronic component 10, a significant advantage in that the external electrodes 14 and 15 can be formed in a short time can be achieved.

Figure 4B:
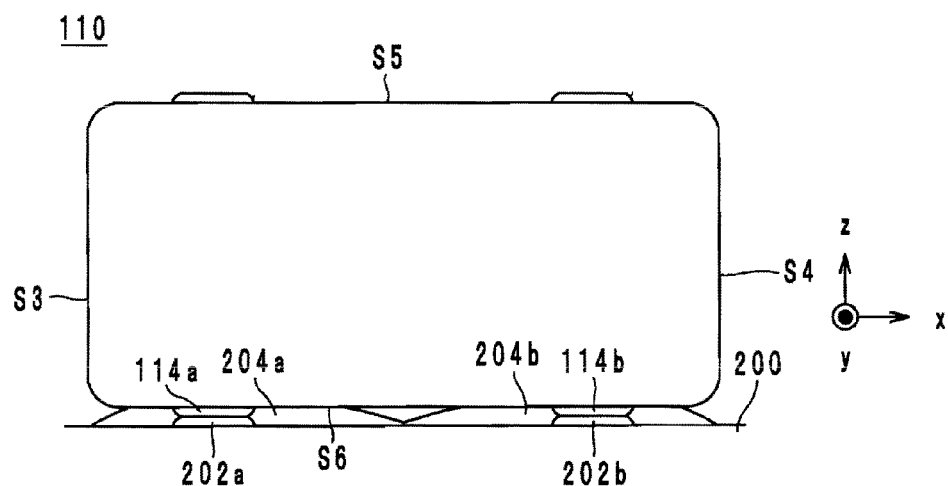
FIG. 4B is a view of an electronic component according to a comparative example mounted on a circuit board.

In addition, when the electronic component 10 is mounted on the circuit board 200, a short circuit generated between the external electrodes 14a and 14b can be prevented. Hereinafter, the reason for this will be described with reference to FIGS. 4A and 4B. FIG. 4B is a view showing an electronic component 110 according to a comparative example mounted on the circuit board 200. The electronic component 110 according to the comparative example has a flat upper surface S5 and a flat lower surface S6, and this flat surface is different from that of the electronic component 10.

As shown in FIG. 4B, excessive solders 204a and 204b are generated when the electronic component 110 is mounted on the circuit board 200. The excessive solders 204a and 204b are extended between the lower surface S6 used as a mounting surface and the primary surface of the circuit substrate 200 in the x axis direction. In addition, when the amount of the excessive solders 204a and 204b is large, the excessive solders 204a and 204b come into contact with each other. As a result, a short circuit occurs between external electrodes 114a and 114b.

On the other hand, in the electronic component 10, the lower surface S6 functioning as a mounting surface sinks toward the positive direction side in the z axis direction. Therefore, a space between the lower surface S6 of the electronic component 10 and the primary surface of the circuit board 200 is larger than that between the lower surface S6 of the electronic component 110 and the primary surface of the circuit board 200. Hence, the excessive solders 204a and 204b are prevented from extending in the x axis direction so as to come into contact with each other. As a result, in the electronic component 10, a short circuit generated between the external electrodes 14a and 14b can be suppressed.

In some cases, the electronic component 10 may be mounted in a circuit board in an embedded state. In particular, a circuit board having a recess portion is prepared. Next, the electronic component 10 is mounted in the recess portion. In this case, a resin adhesive for fixing the electronic component 10 is filled in this recess portion. Next, insulating layers are laminated so as to close the recess portion, thereby forming the circuit board. In this case, the lower surface S6 of the electronic component 10 sinks toward the positive direction side in the z axis direction. Hence, when the electronic component 10 is embedded in the circuit board as described above, the adhesive is likely to enter the space between the lower surface S6 of the electronic component 10 and a mounting surface of the circuit board. As a result, the electronic component 10 is tightly fixed to the circuit board.

The present inventors carried out the following experiments in order to more clarify the advantages of the electronic component 10 according to a preferred embodiment of the present invention. In particular, six types of electronic components having the following conditions were formed. 10 pieces of electronic components were formed respectively for the first to fifth example and comparative example.

Size: 1.0 mm×0.5 mm×0.5 mm
Number of ceramic layers: 475 layers
Number of ceramic layers in an inner layer region: 445 layers
Number of ceramic layers in each outer layer region: 15 layers
Material for a ceramic layer: Barium titanate-based dielectric ceramic
Thickness of each ceramic layer: 0.7 μm
Material for a capacitor conductor: A metal containing Ni as a primary component.
Rated voltage: 4.0 V
Electrostatic capacitance: 10 μF One example of barrel polishing process conditions for forming the six types of electronic components is shown below.
Barrel apparatus: Wet barrel apparatus
Media: Zirconia ball (1.0 mm in diameter)
Pod: 340 cc
Number of revolutions: 250 rpm
Process time: 10 to 300 minutes One example of conditions of a strike plating method for forming the six types of electronic components is shown below.
Thickness: 5 μm
Plating solution: "Pyrobright process (Pyrobright PY-61 bath)" manufactured by Uyemura & CO., LTD.
Bath temperature: 55° C.
pH: 8.6
Barrel: Horizontal rotation barrel
Number of revolutions: 60 rpm
Diameter of conductive media: 0.4 mm
Current density: 0.1 A/dm2
Time: 300 minutes Among the six types of electronic components, a ratio X (=D/L×100(%)) of a protrusion amount D to a length L shown in FIG. 3 was different from each other as shown in a first to a fifth example and a comparative example. The protrusion amount D was obtained by measuring a surface shape of the upper surface S5 and that of the lower surface S6 using a laser displacement gauge (KS-1100: manufactured by KEYENCE Corporation). In addition, the length L was measured by a slide caliper. The ratio X was an average of values of 10 pieces in each of the first to fifth example and comparative example.
First example: 1.7%
Second example: 5.3%
Third example: 7.9%
Fourth example: 11.5%
Fifth example: 17.2%
Comparative Example: 0%

In addition, in order to change the ratio X, a barrel polishing process time was changed. In particular, the times were set to 10, 30, 90, 180, 300, and 0 minutes in the first example, the second example, the third example, the fourth example, the fifth example, the comparative example, respectively. Since the barrel polishing process conditions were the same as those described above, a description thereof is omitted. In addition, since the plating conditions for forming the external electrodes 14 and 15 were also the same as those described above, a description thereof is also omitted.

The thicknesses of the external electrodes 14 and 15 formed in each of the first to the fifth examples and the comparative example were measured. By using XRF (SFT-9450: manufactured by SII Nano Technology Inc.), the thickness was obtained in such a way that x-ray intensity was measured and was then converted into the thickness using a detection line method. The thicknesses of the external electrodes 14 and 15 were an average of values of 10 pieces in each of the first to fifth example and comparative example. Table 1 is a table showing the experimental results.

TABLE 1

|  | Film Thickness (μm) |
| --- | --- |
| First example | 4.8 |
| Second example | 5.0 |
| Third example | 5.3 |
| Fourth example | 5.6 |
| Fifth example | 5.7 |
| Comparative example | 4.7 |

As shown in Table 1, it is found that as the ratio X is increased, the thickness is increased. That is, it is found that the formation rate of the external electrodes 14 and 15 is increased as the ratio X is increased. Accordingly, it is found that when the regions of the upper surface S5 and the lower surface S6 at which the exposed portions 26a, 26b, 28a, and 28b are provided are allowed to protrude from the other regions, the external electrodes 14 and 15 can be formed in a short time.

Figure 5:
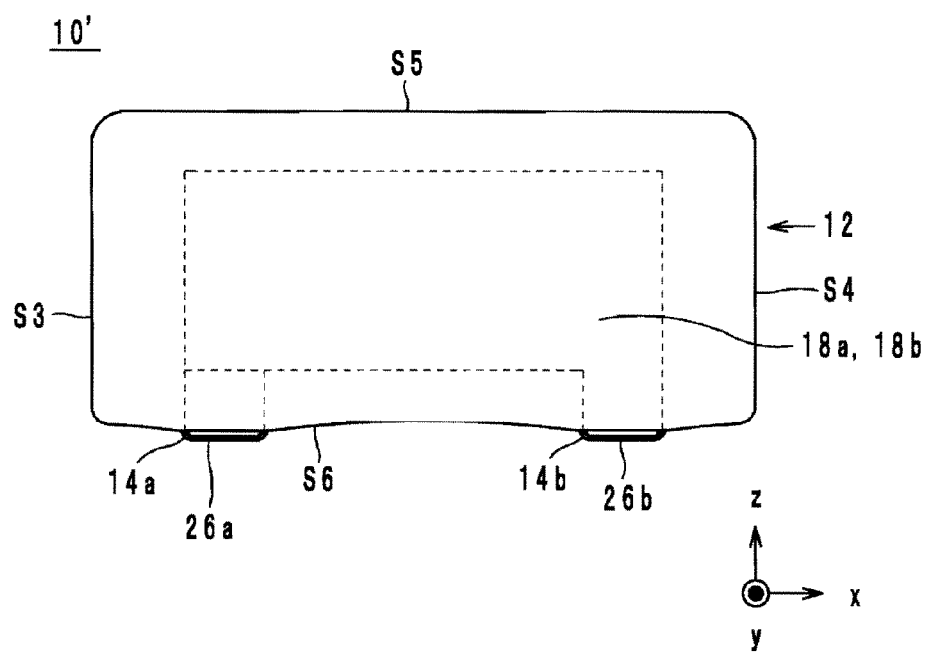
FIG. 5 is a perspective view of an electronic component according to a first modified preferred embodiment when viewed from above in a lamination direction.

FIG. 5 is a perspective view of an electronic component 10' according to a first modified preferred embodiment when viewed from above in a lamination direction. As the electronic component 10' shown in FIG. 5, the external electrodes 15a and 15b and the lead portions 24a and 24b may not be provided.

Figure 6:
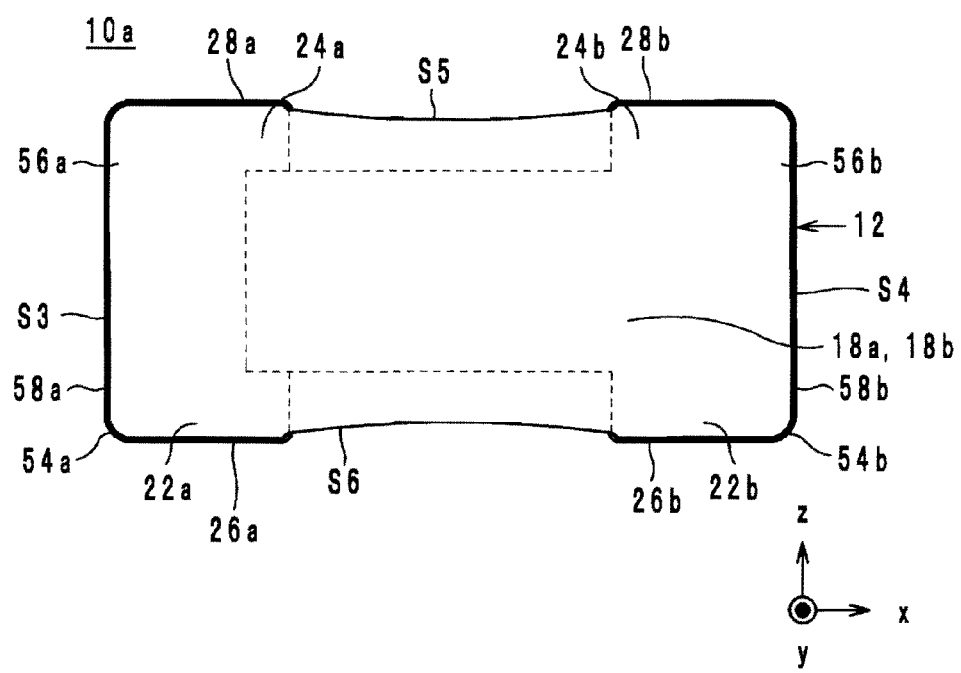
FIG. 6 is a perspective view of an electronic component according to a second modified preferred embodiment when viewed from above in a lamination direction.

FIG. 6 is a perspective view of an electronic component 10a according to a second modified preferred embodiment when viewed from above in a lamination direction. The electronic component 10a shown in FIG. 6 has the capacitor conductors 18a and 18b and lead portion 56a and 56b. In addition, instead of using the external electrodes 14a, 14b, 15a, and 15b, external electrodes 54a and 54b are provided.

The lead portions 56a are extended to the shorter side of the ceramic layer 16 at the negative direction side in the x axis direction. Accordingly, each lead portion 56a has an exposed portion 58a exposed between adjacent two ceramic layers 16 at the end surface S3. The exposed portion 58a is connected to the exposed portions 26a and 28a.

The lead portions 56b are extended to the shorter side of the ceramic layer 16 at the positive direction side in the x axial direction. Accordingly, each lead portion 56b has an exposed portion 58b exposed between adjacent two ceramic layers 16 at the end surface S4. The exposed portion 58b is connected to the exposed portions 26b and 28b.

The external electrode 54a is provided on the end surface S3, the upper surface S5, and the lower surface S6 so as to cover the exposed portions 26a, 28a, and 58a. As shown in FIG. 6, the external electrode 54a plan viewed from the positive direction side in the y axial direction has a substantially U shape.

The external electrode 54b is provided on the end surface S4, the upper surface S5, and the lower surface S6 so as to cover the exposed portions 26b, 28b, and 58b. As shown in FIG. 6, the external electrode 54b plan viewed from the positive direction side in the y axial direction has a substantially U shape.

According to the electronic component 10a described above, as in the electronic component 10 described above, the external electrodes 54 can also be formed in a short time.

Figure 7:
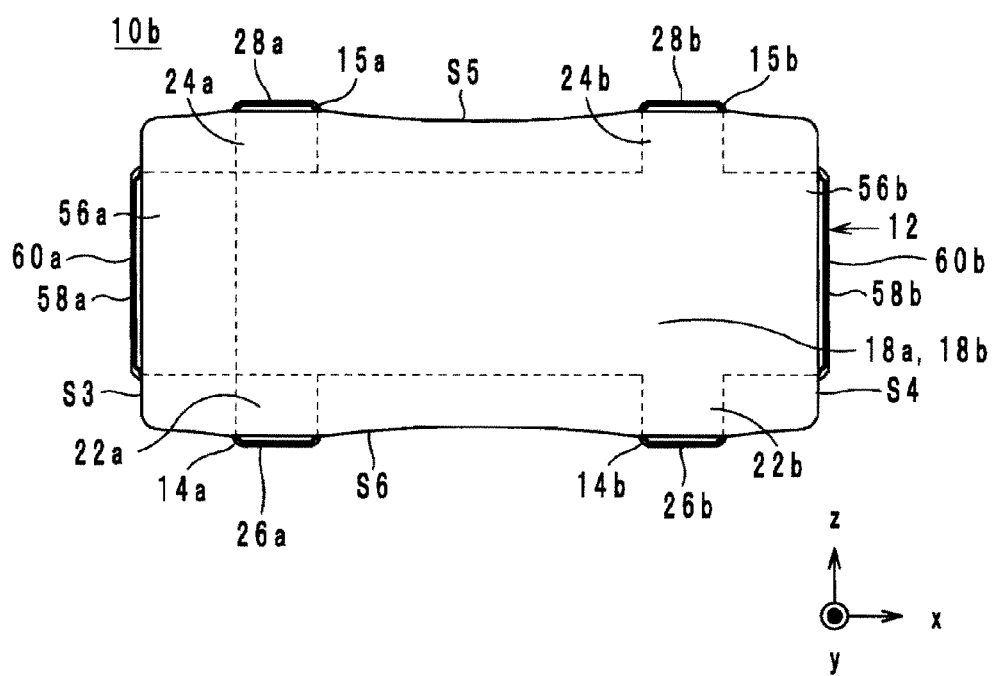
FIG. 7 is a perspective view of an electronic component according to a third modified preferred embodiment when viewed from above in a lamination direction.

FIG. 7 is a plan view of an electronic component 10b according to a third modified preferred embodiment when viewed from above in a laminating direction. In the electronic component 10b shown in FIG. 7, the lead portion 56a is not connected to the lead portions 22a and 24a. As in the case described above, the lead portion 56b is not connected to the lead portions 22b and 24b. In addition, the electronic component 10b further includes external electrodes 60a and 60b.

The lead portions 56a are extended to the shorter side of the ceramic layer 16 at the negative direction side in the x axial direction. Accordingly, each lead portion 56a has the exposed portion 58a exposed between adjacent two ceramic layers 16 at the end surface S3. However, the exposed portion 58a is not connected to the exposed portions 26a and 28a. That is, the capacitor conductor 18a is not provided at the corner of the ceramic layer 16.

The lead portions 56b are extended to the shorter side of the ceramic layer 16 at the positive direction side in the x axial direction. Accordingly, each lead portion 56b includes the exposed portion 58b exposed between adjacent two ceramic layers 16 at the end surface S4. However, the exposed portion 58b is not connected to the exposed portions 26b and 28b. That is, the capacitor conductor 18b is not provided at the corner of the ceramic layer 16.

The region of the end surface S3 at which the exposed portion 58a is provided protrudes toward the negative direction side in the x axis direction from the other regions of the end surface S3. As in the case described above, the region of the end surface S4 at which the exposed portion 58b is provided protrudes toward the positive direction side in the x axis direction from the other regions of the end surface S4.

The external electrode 60a is arranged on the end surface S3 so as to cover the exposed portion 58a. The external electrode 60b is provided on the end surface S4 so as to cover the exposed portion 58b.

According to the above electronic component 10b, as is the case of the electronic component 10, the external electrodes 14, 15 and 60 can also be formed in a short time.

The electronic component 10 according to the present invention is not limited to those described in the above preferred embodiments and may be modified within the scope of the present invention.

In addition, in the electronic components 10, 10', 10a, and 10b, the circuit element embedded in the laminate 12 is not limited to the capacitor C. Hence, as the circuit element, a piezoelectric component, a resistor, a coil, a thermistor, or the like may be used, for example. When the circuit element is a piezoelectric component, for example, a piezoelectric ceramic, such as a PZT-based ceramic, may be used as a material for the ceramic layer 16. In addition, when the circuit element is a thermistor, for example, a semiconductor ceramic, such as a spinel-based ceramic, may be used as a material for the ceramic layer 16. Furthermore, when the circuit element is a coil, for example, a magnetic ceramic may be used as a material for the ceramic layer 16.

In addition, in addition to the plating method described above, the external electrodes 14, 15, 54*a*, 54*b*, 60*a*, and 60*b* may be formed by performing a plating method twice, for example. In particular, after an underlayer plating film is formed by a first plating method, an upper layer plating film may be then formed on the underlayer plating film by a second plating method. A material for the underlayer plating film and the upper layer plating film preferably is a metal selected from the group consisting of Cu, Ni, Sn, Pb, Au, Ag, Pd, Bi, and Zn or an alloy formed of at least two thereof. When Ni is used as a material for the capacitor conductor 18, Cu, which has good compatibility with Ni, is preferably used as the material for the underlayer plating film. In addition, the upper layer plating film may be formed to have a two-layered structure which includes a first upper layer plating film and a second upper layer plating film. As a material for the first upper layer plating film in contact with the underlayer plating film, Ni, which is not likely to be eroded by a solder, is preferably used. In addition, as a material for the second upper layer plating film exposed to the outside, Sn or Au, which is excellent in solder wettability, is preferably used. The thicknesses of the underlayer plating film, the first upper layer plating film, and the second upper layer plating film are each preferably in a range of about 1 μm to about 15 μm, for example.

As described above, preferred embodiments of the present invention are effectively applied to an electronic component and a method for manufacturing the same and are particularly superior since the external electrodes can be formed in a short time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a laminate including ceramic layers laminated to each other;
   a first internal conductor and a second internal conductor which are embedded in the laminate and which include a first exposed portion and a second exposed portion, respectively, exposed between the ceramic layers at a mounting surface of the laminate; and
   a first external electrode and a second external electrode which are plated on the mounting surface so as to directly cover the first exposed portion and the second exposed portion, respectively; wherein
   regions of the mounting surface at which the first exposed portion and the second exposed portion are provided protrude outwardly from a central regions of the mounting surface and from end regions of the mounting surface; and
   each of the first exposed portion of the first internal conductor and the second exposed portion of the second internal conductor protrudes outwardly from the mounting surface of the laminate such that the first exposed portion and the second exposed portion protrude farther outwardly than any portions of the mounting surface of the laminate.

2. The electronic component according to claim 1, wherein a region at which the first internal conductor and the second internal conductor face each other with at least one of the ceramic layers interposed therebetween defines a capacitor.

3. The electronic component according to claim 1, wherein the mounting surface is concavely curved between the region at which the first exposed portion is provided and the region at which the second exposed portion is provided.

4. The electronic component according to claim 3, wherein the mounting surface is a continuous curved surface between the region at which the first exposed portion is provided and the region at which the second exposed portion is provided.

5. A method for manufacturing the electronic component according to claim 1 comprising the steps of:
   preparing the laminate in which the first internal conductor and the second internal conductor are embedded;
   performing a polishing process on the laminate so that the mounting surface thereof is concavely curved between the region at which the first exposed portion is provided and the region at which the second exposed portion is provided; and
   forming the first external electrode and the second external electrode by direct plating so as to cover the first exposed portion and the second exposed portion, respectively.

* * * * *